No. 696,633. Patented Apr. 1, 1902.
E. W. HALL.
INVISIBLE IMPRESSION PRINTING.
(Application filed Feb. 19, 1902.)
(No Model.)
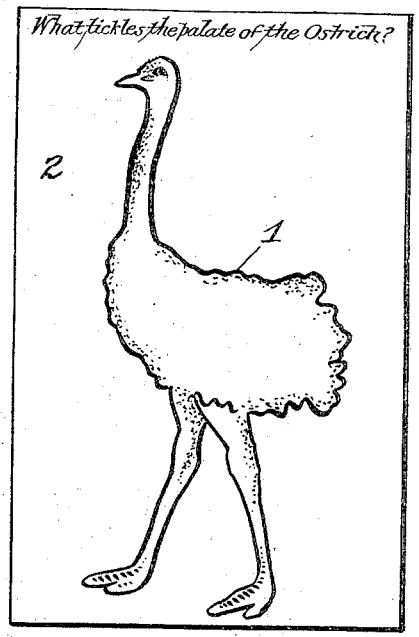
Fig. 1.
Fig. 2.
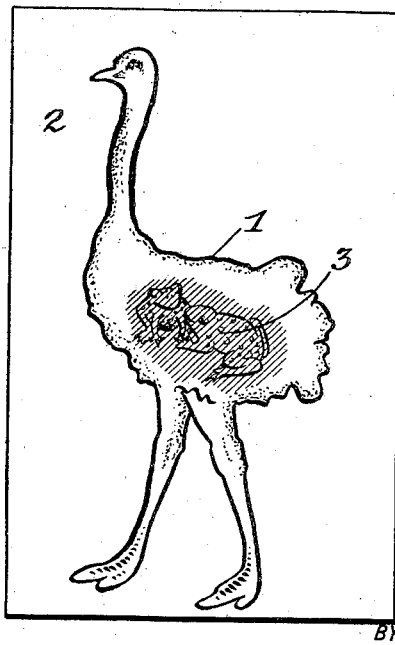
Fig. 3.
WITNESSES:
INVENTOR
Edward W. Hall,
BY
his ATTORNEY.

UNITED STATES PATENT OFFICE.

EDWARD W. HALL, OF RUTHERFORD, NEW JERSEY, ASSIGNOR TO HIMSELF, AND H. CLARENCE FISHER AND JOHN L. OBERLY, OF NEW YORK, N. Y.

INVISIBLE-IMPRESSION PRINTING.

SPECIFICATION forming part of Letters Patent No. 696,633, dated April 1, 1902.

Application filed February 19, 1902. Serial No. 94,790. (No model.)

*To all whom it may concern:*

Be it known that I, EDWARD W. HALL, a citizen of the United States, residing at Rutherford, in the county of Bergen and State of New Jersey, have invented certain new and useful Improvements in Invisible-Impression Printing, of which the following is a specification.

This invention relates to invisible-impression printing; and it has for its object to provide certain improvements in the art whereby the relative association of visible and invisible pictorial or other representations and the development of the invisible part in its relation to the visible part will produce a composite complete entity or whole in the nature of a "surprise" pictorial or other representation.

To these ends my improvements comprise, substantially, the producing upon an impression-receiving surface of a visible pictorial or other representation constituting in itself an entity or individual whole and also a substantially invisible pictorial or other representation constituting in itself an entity or individual whole, said visible and invisible representations being arbitrarily distinctive with respect to each other and respectively associated or correlated, so that they are adapted to conjointly produce a composite complete pictorial or representative entity or whole when the invisible representation is developed or rendered visible, in which the visible association of the visible and invisible parts completes the full motive or theme of the pictorial or other representation.

In the accompanying drawings I have illustrated one pictorial representation embodying the subject-matter of my invention; but it will be understood that my improvements are capable of a wide or divers variety of pictorial or other representations.

Figure 1 of the drawings is a view representing the visible part of the impression. Fig. 2 is a view representing the invisible part of the impression. Fig. 3 is a view representing the visible and invisible parts of the impression in their mutual correlation or association, the invisible part having been developed or rendered visible.

Corresponding parts in all the figures are denoted by the same numerals of reference.

Referring to the drawings, 1 designates the visible part of the impression or pictorial or other representation, which in the present instance of illustration represents an outline view of an ostrich, this visible part being printed or otherwise produced in any suitable or adapted manner and with any suitable ink or colors upon an impression-receiving sheet or surface 2.

3 designates the invisible part of the impression or pictorial or other representation, which in the present instance illustrates frogs. This invisible part is printed or otherwise produced upon the impression-receiving sheet or surface in any suitable or adapted manner and with any suitable ink or colors, which will produce the outline or substantive illustration or pictorial or other representation upon the surface 2, but at the same time leave said representation substantially invisible. For instance, the part 3 may be printed in a suitable white ink upon a white surface.

The visible and invisible pictorial or other representation 1 and 3, respectively, as above set forth, constitute each in itself an entity or individual whole and are arbitrarily distinctive with respect to each other. They are, however, respectively associated or correlated, so that they are adapted to conjointly produce a complete pictorial or representative entity or whole in which the visible association of the visible and invisible parts completes the full motive or theme of the pictorial or other representation. For instance, in the present illustrative instance the invisible part is printed or produced upon the surface 3 in such position with relation to the visible part that it will be within the body outline of the latter. In other words, the invisible representation of the frogs will be within the body outline of the representation of the ostrich.

In carrying out my invention and improvements to produce the full motive or theme of the pictorial or other representation the invisible part 3 is adapted to be developed or rendered visible. This may be accomplished in any suitable or adapted manner. For instance, when the invisible part is printed in a white or sympathetic ink on a surface corresponding in color to the ink the same may be developed by rubbing over the portion of the surface bearing the invisible part with a lead-pencil, crayon, or other substance or material which will be "taken up" by the sympathetic ink, and thus produce a visible outline and substantive representation of the invisible part.

In carrying out the motive or theme of the composite pictorial or other representation made up of the visible and invisible parts 1 and 3 there may be printed or provided upon the sheet or surface 2 suitable suggestive matter—as, for instance, in relation to the present illustration the words "What tickles the palate of the ostrich," and suitable other matter giving directions for developing the invisible representation may also be provided.

From the foregoing description it will be understood that in carrying out my invention and improvements the producing of the composite pictorial or other representation constituting a complete entity or whole and made up of visible and substantially invisible representations arbitrarily distinctive with respect to each other and constituting each in itself an entity or individual whole produces an entertaining or surprise effect in carrying out the full motive or theme of the representation by the development or rendering visible of the invisible part.

It is obvious that my improvements are adapted for a wide variety of uses and a wide range of subjects in pictorial or other representation, and I therefore do not limit myself to the exact features of illustration or relative position of the visible and invisible parts, as herein shown and described, but reserve the right to all such variation or adaptability to uses as properly falls within the spirit and scope of my improvements and the terms of the following claims.

Having thus described my invention, I claim and desire to secure by Letters Patent—

1. As an improvement in the art of printing or developing pictures or other representations, the herein-described method consisting in producing upon an impression-receiving surface a visible pictorial or other representation constituting in itself an entity or individual whole and also a substantially invisible pictorial or other representation constituting in itself an entity or individual whole, said visible and invisible representations being arbitrarily distinctive with respect to each other and respectively associated or correlated so that they are adapted to conjointly produce a complete pictorial or representative entity or whole in which the visible association of the visible and invisible parts completes the full motive or theme of the pictorial or other representation, and then developing the invisible representation to render the same visible in association with the visible representation to produce said composite complete entity or whole.

2. An impression-receiving sheet having upon its surface a visible pictorial or other representation constituting in itself an entity or individual whole and also having a substantially invisible pictorial or other representation constituting in itself an entity or individual whole, said visible and invisible representations being arbitrarily distinctive with respect to each other and respectively associated or correlated so that they are adapted to conjointly produce a complete pictorial or representative entity or whole in which the visible association of the visible and invisible parts complete the full motive or theme of the pictorial or other representation, said invisible impression being capable of development to produce visibility.

3. An impression-receiving sheet having visibly printed or produced upon its surface a pictorial or other representation constituting in itself an entity or individual whole and also having a pictorial or other representation constituting in itself an entity or individual whole and printed or produced upon its surface in a substantially invisible or sympathetic ink capable of development to visibility by treatment of the surface having said invisible representation with a pencil, crayon, or other material or substance which will be "taken up" by said ink, said visible and invisible representations being arbitrarily distinctive with respect to each other and respectively associated or correlated so that they are adapted to conjointly produce a complete pictorial or representative entity or whole in which the visible association of the visible and invisible parts completes the full motive or theme of the pictorial or other representation.

In testimony whereof I have signed my name in the presence of the subscribing witnesses.

EDWARD W. HALL.

Witnesses:
  MARGARET M. DURKIN,
  JOHN M. HOCTOR.